(12) United States Patent
Munier

(10) Patent No.: US 12,149,471 B2
(45) Date of Patent: Nov. 19, 2024

(54) FLEXIBLE RECONFIGURATION OF THE SOUNDING REFERENCE SIGNAL

(71) Applicant: Telefonaktiebolaget LM Ericsson (publ), Stockholm (SE)

(72) Inventor: Florent Munier, Västra Frölunda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 206 days.

(21) Appl. No.: 17/762,260

(22) PCT Filed: Sep. 25, 2020

(86) PCT No.: PCT/EP2020/076966
§ 371 (c)(1),
(2) Date: Mar. 21, 2022

(87) PCT Pub. No.: WO2021/063839
PCT Pub. Date: Apr. 8, 2021

(65) Prior Publication Data
US 2022/0337365 A1    Oct. 20, 2022

Related U.S. Application Data

(60) Provisional application No. 62/910,897, filed on Oct. 4, 2019.

(51) Int. Cl.
*H04L 5/00* (2006.01)
(52) U.S. Cl.
CPC .................................. *H04L 5/0048* (2013.01)
(58) Field of Classification Search
CPC . H04L 5/0048; H04L 5/0094; H04L 27/2613; H04L 27/2646; H04L 5/00; H04L 27/00
See application file for complete search history.

(56) References Cited

U.S. PATENT DOCUMENTS

| | | | |
|---|---|---|---|
| 2011/0058505 A1* | 3/2011 | Pan | H04L 5/0048 370/280 |
| 2020/0313932 A1* | 10/2020 | Sun | H04L 25/0226 |

FOREIGN PATENT DOCUMENTS

CN    101610607 A    12/2009

OTHER PUBLICATIONS

Indian Examination Report dated Sep. 22, 2022 for Application No. 202247025351, consisting of 6 pages.
(Continued)

*Primary Examiner* — Mohamed A Kamara
(74) *Attorney, Agent, or Firm* — Weisberg I.P. Law. P.A.

(57) ABSTRACT

Methods and apparatuses are disclosed for flexible reconfiguration of the sounding reference signal (SRS). In one embodiment, a method implemented in a network node includes signaling a sounding reference signal (SRS) configuration, the SRS configuration including an SRS configuration parameter that indicates whether to use one of a staggered comb and a non-staggered comb for an SRS transmission; and receiving the SRS transmission according to the one of the staggered comb and the non-staggered comb indicated by the SRS configuration parameter. In one embodiment, a method implemented in a WD includes receiving a SRS configuration, the SRS configuration including an SRS configuration parameter that indicates whether to use one of a staggered comb and a non-staggered comb for an SRS transmission; and transmitting the SRS transmission according to the one of the staggered comb and the non-staggered comb indicated by the SRS configuration parameter.

16 Claims, 11 Drawing Sheets

(56) References Cited

OTHER PUBLICATIONS

International Search Report and Written Opinion dated Dec. 14, 2020 for International Application No. PCT/EP2020/076966 filed Sep. 25, 2020, consisting of 10-pages.
3GPP TSG-RAN WG1 Meeting #98bis R1-19NNNN; Title: UL Reference Signals for NR Positioning; Agenda Item: 7.2.10.2; Source: Ericsson; Document for: Discussion and decision; Date and Location: Oct. 14-20, 2019, Chongqing, P.R. China, consisting of 12-pages.
3GPP TSG RAN WG1 Meeting #98 R1-1908115; Title: SRS design for NR positioning; Agenda Item: 7.2.10.2; Source: Huawei, HiSilicon; Document for: Discussion and Decision; Date and Location: Aug. 26-30, 2019, Prague, Czech Republic, consisting of 13-pages.
3GPP TSG RAN WG1 Meeting #98 R1-1908357; Title: Discussion on UL Reference Signals for NR Positioning; Agenda Item: 7.2.10.2; Source: OPPO; Document for: Discussion and Decision; Date and Location: Aug. 26-30, 2019, Prague, CZ, consisting of 6-pages.
3GPP TSG RAN WG1 Meeting #97 R1-1907700; Title: FL summary for 7.2.10.2 UL Reference Signals for NR Positioning; Agenda Item: 7.2.10.2; Source: Ericsson; Document for: Discussion and decision; Date and Location: May 13-17, 2019, Reno, NV, USA, consisting of 16-pages.

* cited by examiner

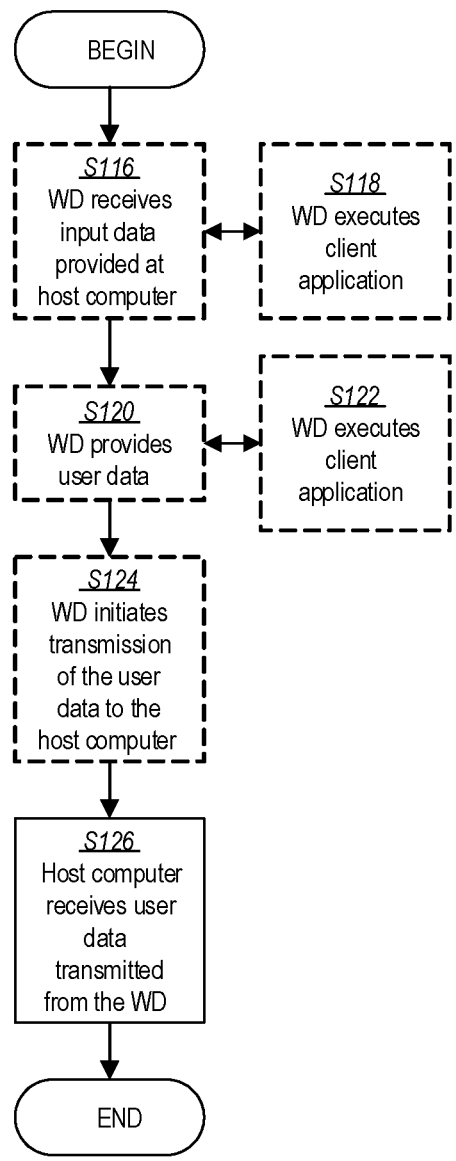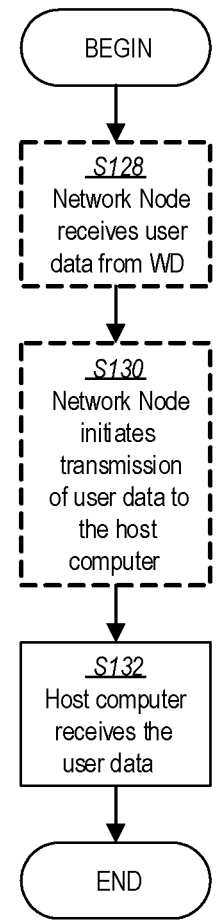
FIG. 7
FIG. 8

FLEXIBLE RECONFIGURATION OF THE SOUNDING REFERENCE SIGNAL

CROSS-REFERENCE TO RELATED APPLICATIONS

This application is a Submission Under 35 U.S.C. § 371 for U.S. National Stage Patent Application of International Application No.: PCT/EP2020/076966, filed Sep. 25, 2020 entitled "FLEXIBLE RECONFIGURATION OF THE SOUNDING REFERENCE SIGNAL," which claims priority to U.S. Provisional Application No. 62/910,897, filed Oct. 4, 2019, entitled "FLEXIBLE RECONFIGURATION OF THE SOUNDING REFERENCE SIGNAL," the entireties of both of which are incorporated herein by reference.

FIELD

The present disclosure relates to wireless communications, and in particular, to flexible reconfiguration of a sounding reference signal (SRS).

INTRODUCTION

The sounding reference signal (SRS) is used in Third Generation Partnership Project (3GPP) New Radio (NR), also called 5G, to enable uplink channel sounding from a wireless device (WD), a similar role to that of the channel state information-reference signal (CSI-RS) in the downlink.

Uplink sounding reference signals are known signals transmitted on the uplink direction (i.e., mobile-terminal-to-network). Sounding reference signals can be used by the receiver (i.e., the base station) to estimate uplink channel quality, including the uplink channel quality for different frequency bands. The channel quality estimates can, for example, be used by an uplink scheduler located in the base station to determine a suitable uplink data rate (i.e., uplink rate control) or select a suitable frequency band for the uplink transmission for a given mobile terminal (also known as channel-dependent frequency-domain scheduling).

Uplink sounding reference signals can also be used by the receiver to estimate the timing of received signals. Such receive-timing estimates can be subsequently used by the network to adjust the mobile terminal transmit timing in order to time-align the receive timing of the uplink transmissions of different mobile terminals. Other uses of the uplink sounding reference signals are also possible.

Different uses of uplink sounding reference signals may require different characteristics for the reference signals. For example, if a sounding reference signal is to be used for channel-quality estimation, a sounding reference signal of relatively narrow bandwidth (i.e., relatively few transmitted sub-carriers) may be sufficient if scheduling is only to be carried out over a limited bandwidth. However, the sounding reference signal is typically transmitted relatively often (i.e., relatively small period) in order to track relatively fast channel variations. On the other hand, for timing-estimation purposes, a relatively wideband reference signal may be needed to yield an accurate timing estimation. At the same time, a relatively long reference-signal period is sufficient for timing-estimation purposes as the propagation delay typically varies relatively slowly.

One conventional approach used for both channel-quality estimation and timing estimation purposes involves transmitting a sounding reference signal with wide bandwidth and high rate (i.e., small period). However, this conventional approach uses a relatively large amount of radio resources to transmit the sounding reference signal because of the wide bandwidth and high rate requirements. As such, fewer uplink symbols are available for data transmission. Accordingly, a less radio-resource intensive solution is desired.

The SRS is constructed using low-cubic metric Zadoff-Chu sequences (ZF) over the transmitting bandwidth. Four (4) antenna ports may be dedicated to SRS. Each port may be transmitted using a different cyclic shift in the ZF sequence. In 3GPP, a configuration of SRS in the frequency-time domain is referred to a resource. Multiple resources can be combined in a resource set. A resource may be defined as a number (1, 2 or 4) of consecutive orthogonal frequency division multiplexing (OFDM) symbols given by the field nrofSymbols contained in the higher layer parameter resourceMapping.

For time resource allocation, the resource may be controlled by the startPosition parameter which gives an offset to the SRS position, counting backward from the end of the slot. In the frequency domain, the resource start position may be controlled by the parameter freqDomainShift plus a comb offset. An example of the allocation is illustrated in FIG. 1.

In the frequency domain, the allocated bandwidth in configured by the higher layer in a number of physical resource blocks (PRBs), based on the parameters included in the higher layer parameter freqHopping.

The SRS resource may be configured to transmit a combed signal; that is to say a signal where only a subset of equally spaced subcarriers in the OFDM symbol are occupied, as shown in FIG. 2 for example. SRS configuration allows a comb 2 and comb 4 configuration in 3GPP Release 15 (Rel-15), with comb size 8 to be added in 3GPP Release 16 (Rel-16).

In 3GPP Release 16, a new method of transmission was discussed so that the SRS may cover all subcarriers, but not at the same time. This is referred to as staggered comb transmission. There is currently no configuration possibility to use either non-staggered comb, or staggered comb transmission. Therefore, the type of comb transmission may be tied to the reason SRS is transmitted, which is configured by the parameter usage in the SRS configuration. For each usage there may be a specific use case in mind. For example, pre-existing (Rel-15) usages for SRS may include the following:

nonCodebook: is aimed, as the name suggests, at enabling non-codebook based physical uplink shared channel (PUSCH) transmission. This SRS usage is restricted to a single SRS resource set made of up to four 1-port SRS resources. This SRS configuration is aimed at giving the possibility for the network, e.g., network node, to confirm or revise the choice of PUSCH precoding by the WD (e.g., user equipment), so that the network can respond by down-selecting some of the layers (precoders) selected by the WD via the SRS resource indicator (SRI) field in downlink control information (DCI).

Codebook: is aimed at enabling codebook-based transmission of PUSCH. In this usage the SRS is transmitted for reciprocity-based channel sounding, and the network responds to the SRS transmission by sending the suitable precoding matrix to the WD. Only a single resource set may be configured with up to two SRS resources.

beamManagement: is aimed at identifying suitable beam candidates. In this usage, only one resource per resource set may be transmitted at a given time instant.

Antenna switching: is aimed at reciprocity-based downlink (DL) channel state information (CSI) acquisition via SRS carrier switching.

SUMMARY

Some embodiments advantageously provide methods, systems, and apparatuses for flexible reconfiguration of a sounding reference signal (SRS).

In one embodiment, a method implemented in a network node includes signaling a sounding reference signal (SRS) configuration, the SRS configuration including an SRS configuration parameter that indicates whether to use one of a staggered comb and a non-staggered comb for an SRS transmission; and receiving the SRS transmission according to the one of the staggered comb and the non-staggered comb indicated by the SRS configuration parameter.

In one embodiment, a method implemented in a wireless device (WD) includes receiving a sounding reference signal (SRS) configuration, the SRS configuration including an SRS configuration parameter that indicates whether to use one of a staggered comb and a non-staggered comb for an SRS transmission; and transmitting the SRS transmission according to the one of the staggered comb and the non-staggered comb indicated by the SRS configuration parameter.

There is currently no way to choose what transmission method to use, i.e., to choose staggered or non-staggered comb for a SRS transmission. Currently, the use of staggered comb transmission is tied to the usage parameter. For example, the staggered comb SRS transmission may be tied to usage such as positioning. However, in positioning, the non-staggered comb SRS transmission can also be beneficial. Therefore, an objective of the embodiments disclosed herein is to allow for more flexible use and selection of different SRS configurations.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
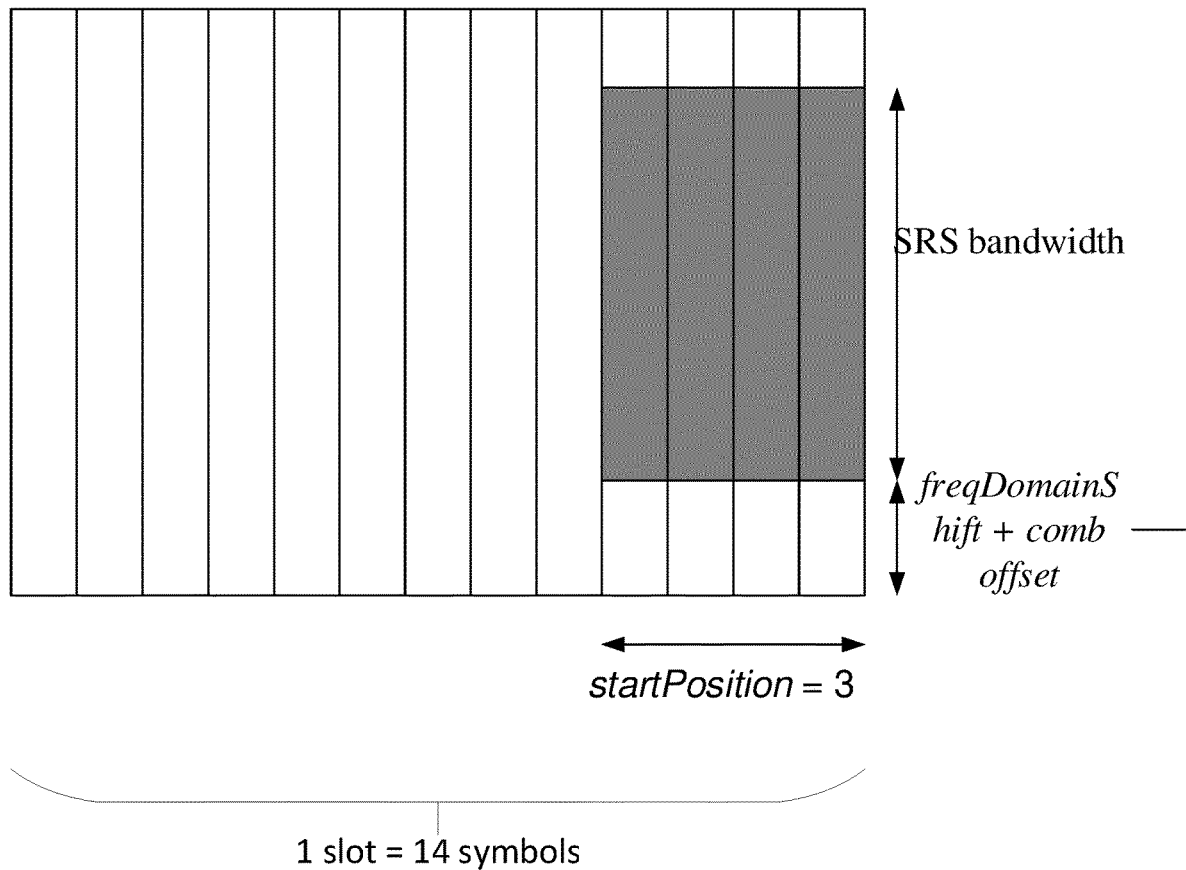
FIG. 1 illustrates an example of SRS position in a slot.
Figure 2:
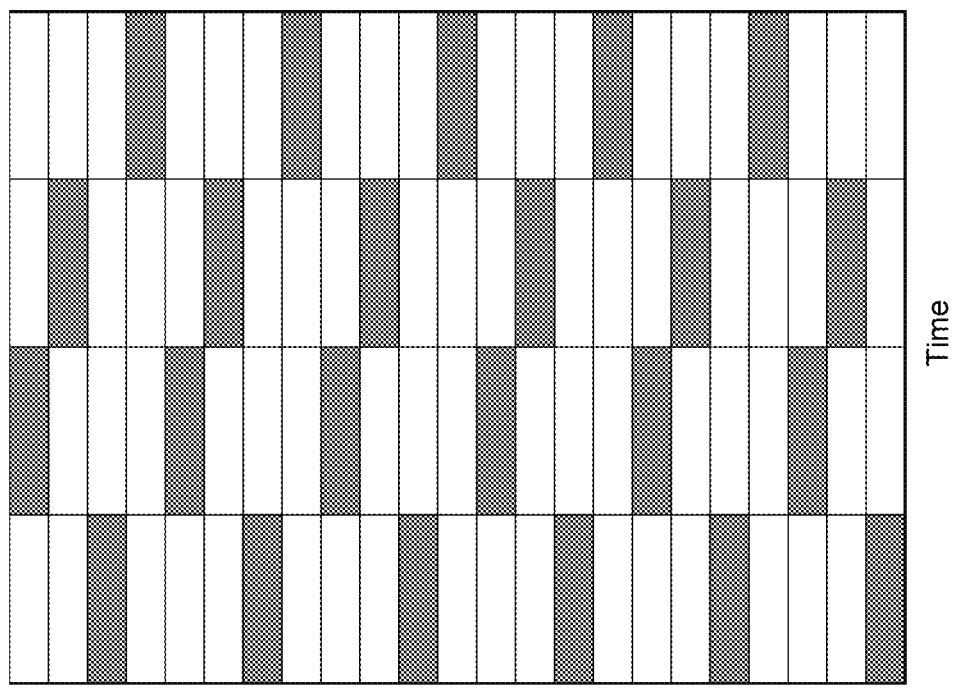
FIG. 2 illustrates an example of a non-staggered (left) and a staggered (right) comb transmission.
Figure 2:
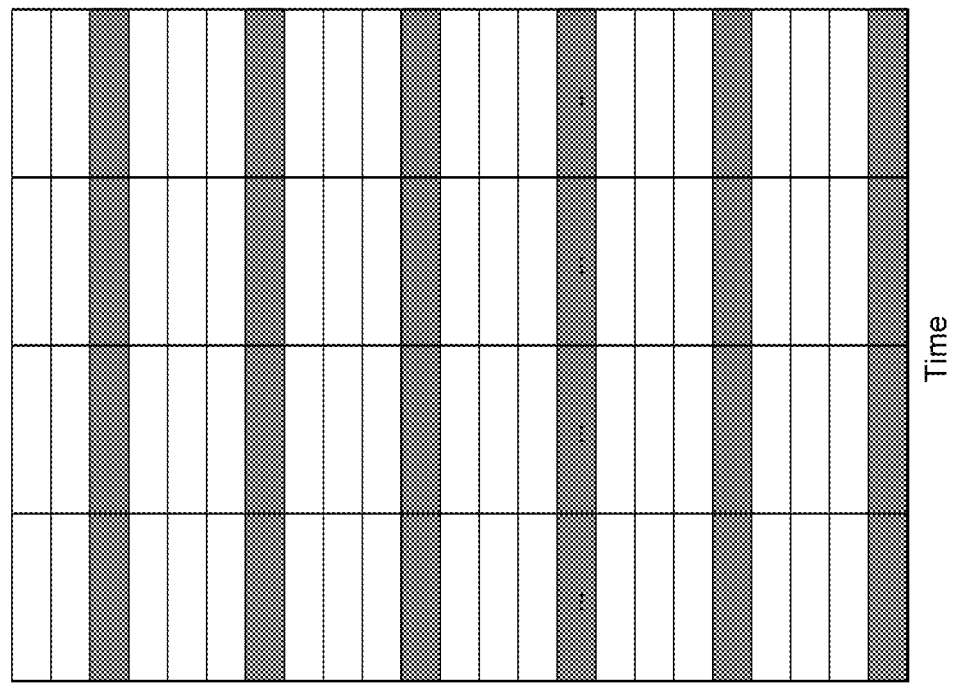

A new usage of SRS for positioning is being considered. In that usage, staggered comb transmission may be possible by default.

There are currently no arrangements to choose what transmission method to use such as choose between staggered and non-staggered comb. Due to this, the staggered comb transmission may be tied to the usage parameter set to positioning. But even in positioning, for example, the non-staggered comb may be able to provide a benefit. Therefore, it may be of interest to keep the configuration flexible. Thus, some embodiments of the present disclosure provide arrangements that allow a choice/selection between different patterns in, e.g., a semi-static configuration.

Before describing in detail exemplary embodiments, it is noted that the embodiments reside primarily in combinations of apparatus components and processing steps related to flexible reconfiguration of the sounding reference signal (SRS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Receiving (or obtaining) information may comprise receiving one or more information messages (e.g., an RRC parameter). It may be considered that receiving signaling comprises demodulating and/or decoding and/or detecting, e.g. blind detection of, one or more messages, in particular a message carried by the signaling, e.g. based on an assumed set of resources. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain perform SRS transmissions according to some embodiments of the present disclosure.

A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE or NR standards. A data transmission may represent and/or pertain to transmission of specific data, e.g., a specific block of data and/or transport block.

Any two or more embodiments described in this disclosure may be combined in any way with each other.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
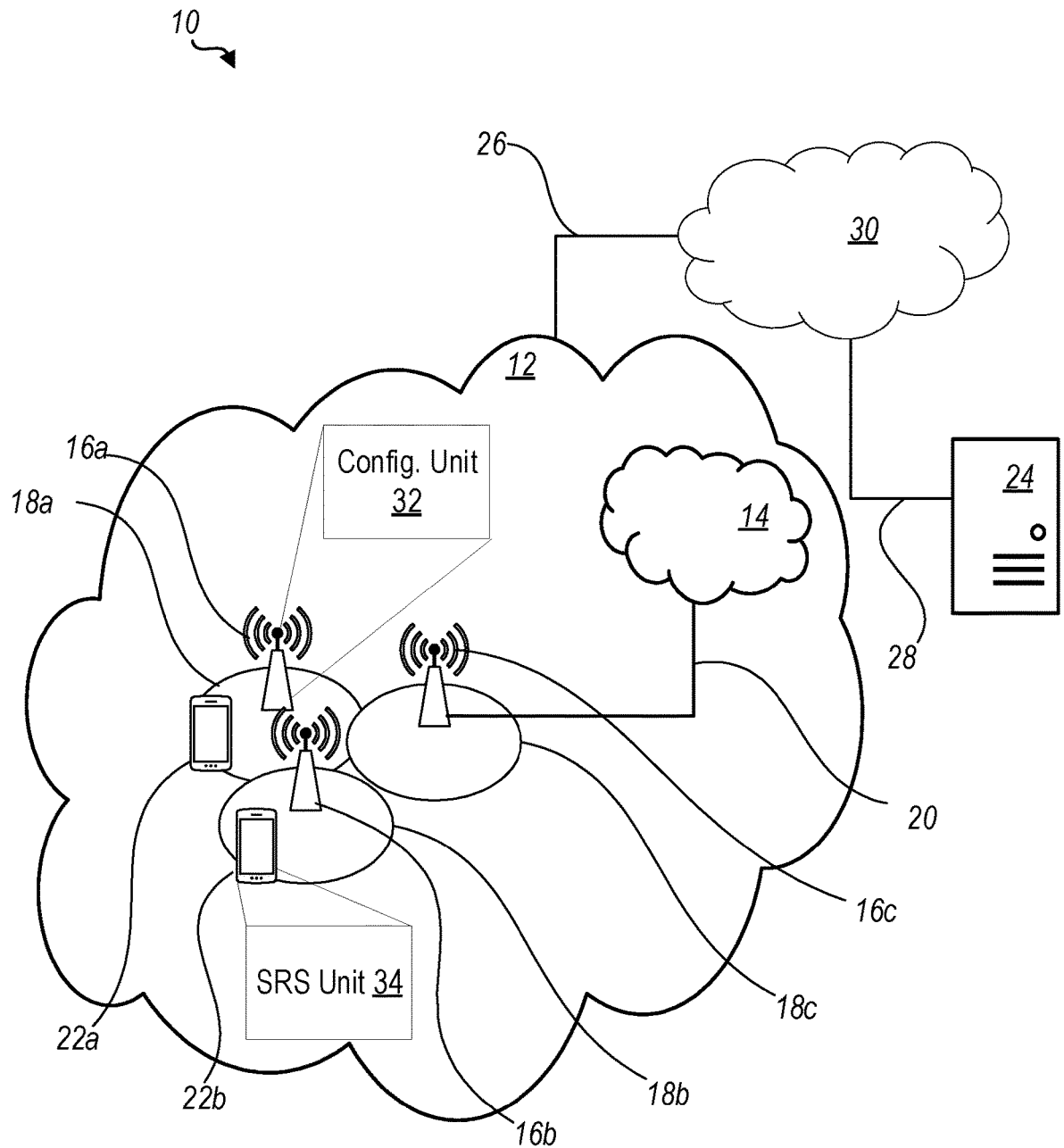
FIG. 3 is a schematic diagram of an exemplary network architecture illustrating a communication system connected via an intermediate network to a host computer according to the principles in the present disclosure.

Some embodiments provide for flexible reconfiguration of the sounding reference signal (SRS). Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to signal a sounding reference signal (SRS) configuration, the SRS configuration including an SRS configuration parameter that indicates whether to use one of a staggered comb and a non-staggered comb for an SRS transmission; and receive the SRS transmission according to the one of the staggered comb and the non-staggered comb indicated by the SRS configuration parameter.

A wireless device 22 is configured to include an SRS unit 34 which is configured to receive a sounding reference signal (SRS) configuration, the SRS configuration including an SRS configuration parameter that indicates whether to use one of a staggered comb and a non-staggered comb for an SRS transmission; and transmit the SRS transmission according to the one of the staggered comb and the non-staggered comb indicated by the SRS configuration parameter.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform network node methods discussed herein, such as the methods discussed with reference to FIG. 9 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an SRS unit 34 configured to perform WD methods discussed herein, such as the methods discussed with reference to FIG. 10 as well as other figures.

Figure 4:
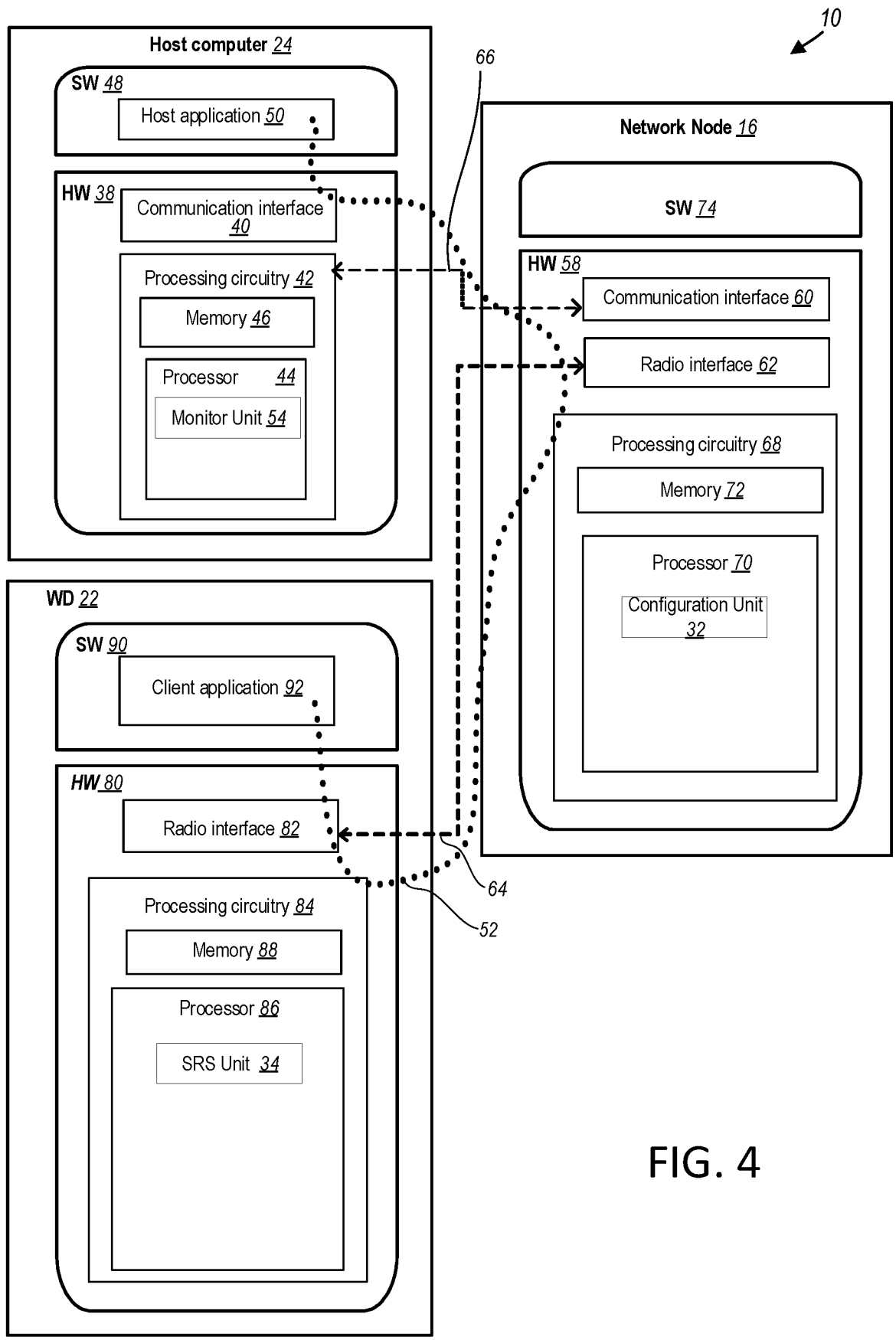
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32, and SRS unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
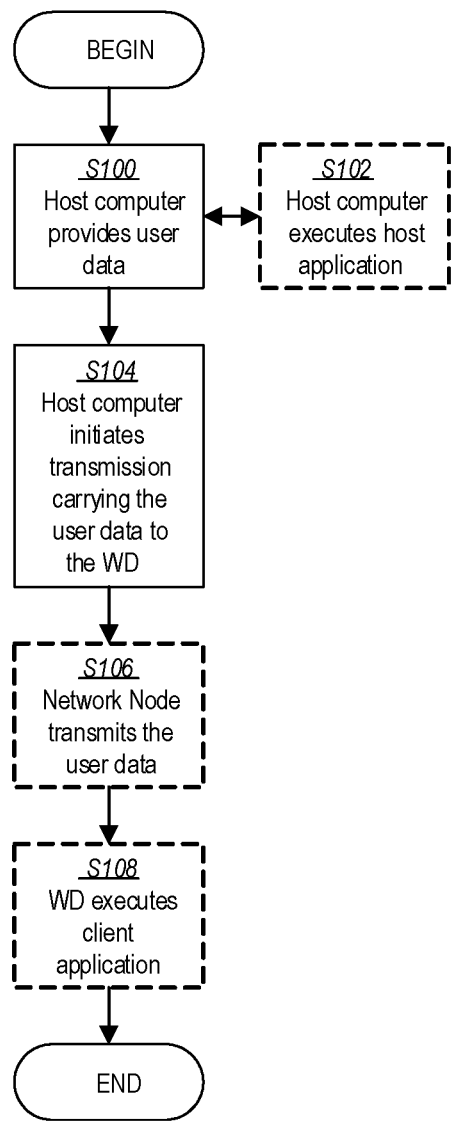
FIG. 5 is a flowchart illustrating exemplary methods implemented in a communication system including a host computer, a network node and a wireless device for executing a client application at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 6:
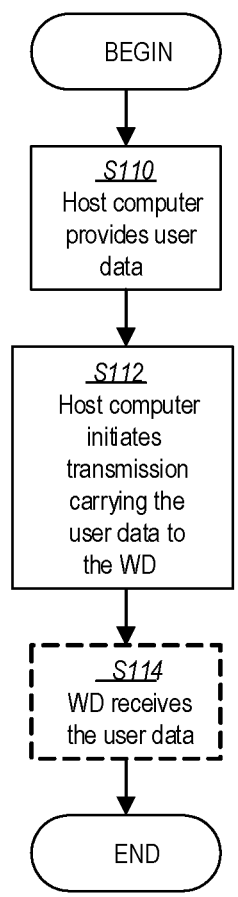
FIG. 6 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
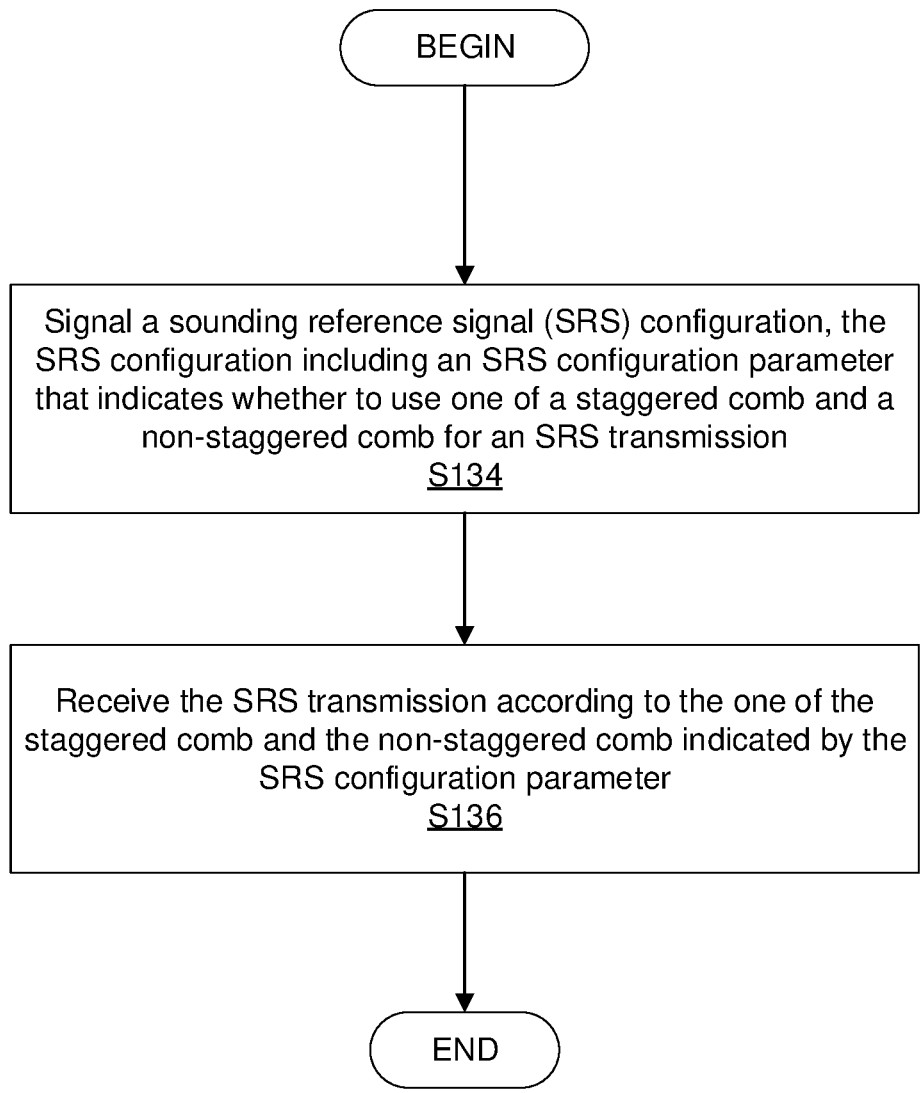
FIG. 9 is a flowchart of an exemplary process in a network node for a configuration unit according to some embodiments of the present disclosure.

FIG. 9 is a flowchart of an exemplary process in a network node 16 for flexible reconfiguration of the sounding reference signal (SRS) according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes signaling (Block S134), such as via configuration unit 32, processing circuitry 68, processor 70 and/or radio interface 62, a sounding reference signal (SRS) configuration, the SRS configuration including an SRS configuration parameter that indicates whether to use one of a staggered comb and a non-staggered comb for an SRS transmission. The method includes receiving (Block S136), such as via configuration unit 32, processing circuitry 68, processor 70 and/or radio interface 62, the SRS transmission according to the one of the staggered comb and the non-staggered comb indicated by the SRS configuration parameter.

In some embodiments, the SRS configuration parameter is signaled via radio resource control (RRC) signaling. In some embodiments, the SRS configuration further includes a usage parameter and the SRS configuration parameter that indicates whether to use one of the staggered comb and the non-staggered comb for the SRS transmission is different from and/or independent of the usage parameter.

Figure 10:
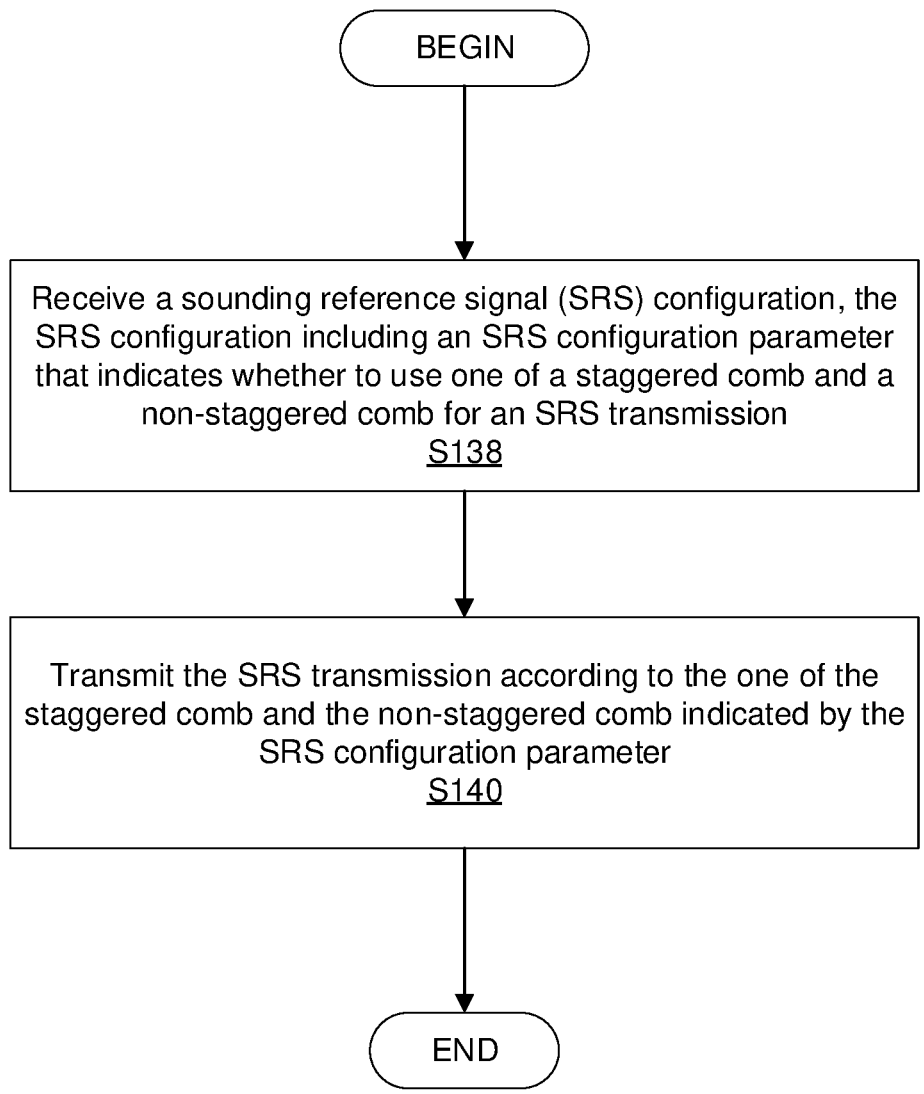
FIG. 10 is a flowchart of an exemplary process in a wireless device for an SRS unit according to some embodiments of the present disclosure.

FIG. 10 is a flowchart of an exemplary process in a wireless device 22 for flexible reconfiguration of the sounding reference signal (SRS) according to some embodiments of the present disclosure. One or more Blocks and/or functions and/or methods performed by WD 22 may be performed by one or more elements of WD 22 such as by SRS unit 34 in processing circuitry 84, processor 86, radio interface 82, etc. The example method includes receiving (Block S138), such as via SRS unit 34, processing circuitry 84, processor 86 and/or radio interface 82, a sounding reference signal (SRS) configuration, the SRS configuration including an SRS configuration parameter that indicates whether to use one of a staggered comb and a non-staggered comb for an SRS transmission. The method includes transmitting (Block S140), such as via SRS unit 34, processing circuitry 84, processor 86 and/or radio interface 82, the SRS transmission according to the one of the staggered comb and the non-staggered comb indicated by the SRS configuration parameter.

In some embodiments, the SRS configuration parameter is received via radio resource control (RRC) signaling. In some embodiments, the SRS configuration further includes a usage parameter and the SRS configuration parameter that indicates whether to use one of the staggered comb and the non-staggered comb for the SRS transmission is different from and/or independent of the usage parameter.

Having described the general process flow of arrangements of the disclosure and having provided examples of hardware and software arrangements for implementing the processes and functions of the disclosure, the sections below provide details and examples of arrangements for flexible reconfiguration of the sounding reference signal (SRS), which may be implemented by the network node 16, wireless device 22 and/or host computer 24.

Figure 11:
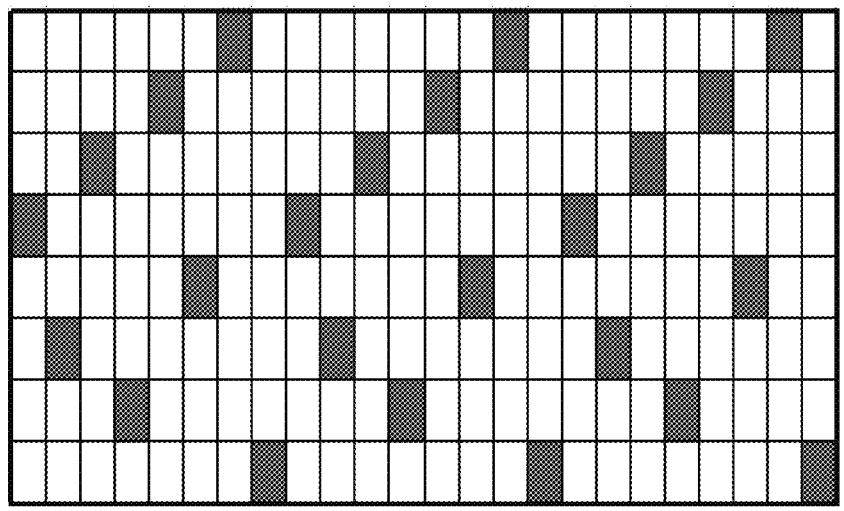
FIG. 11 illustrates an example of staggered comb SRS transmission patterns for staggered combs sizes 2, 4 and 8.
Figure 11:
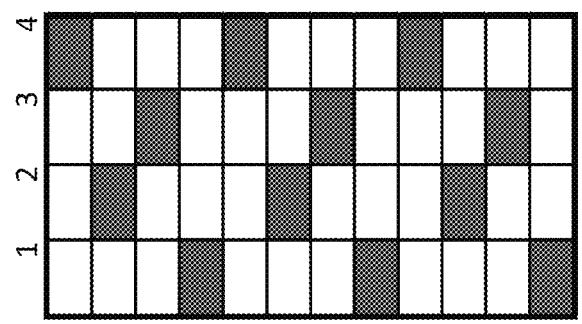
Figure 11:
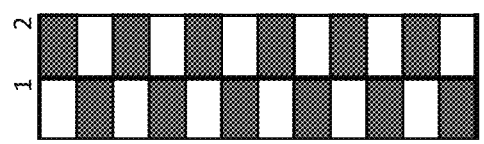

One example of staggered comb transmission patterns that have been considered are shown in FIG. 11 which illustrates example SRS patterns for staggered combs size 2, 4 and 8.

In 3GPP, the SRS resource may be configured (e.g., by network node 16) with, for example:

$N_{symb}^{SRS} \in \{1,2,4, 8, 12\}$ consecutive OFDM symbols given by the field nrofSymbols contained in the higher layer parameter resourceMapping;

$l_0$, the starting position in the time domain given by $l_0 = N_{symb}^{slot} - 1 - l_{offset}$ where the offset $l_{offset} \in \{0,1,\ldots,13\}$ counts symbols backwards from the end of the slot and is given by the field startPosition contained in the higher layer parameter resourceMapping and $l_{offset} \geq N_{symb}^{SRS} - 1$; and/or $k_0$, the frequency-domain starting position of the sounding reference signal.

In some embodiments, in a staggered comb transmission, a relative resource element (RE) offset pattern for SRS may be realized by configuring each SRS OFDM symbol position (with a frequency-domain starting position $k_0^{(p_i)}$ defined by, for example:

$$k_0^{(p_i)} = \bar{k}_0^{(p_i)} + \Sigma_{b=0}^{B_{SRS}} K_{TC} M_{sc,b}^{SRS} n_b + k',$$

Where the RE offset k' is dependent of the comb size and the number of symbols. The RE offset k' values are described for the different comb values and SRS length in Table 1. The 3GPP Release 15 behavior, where the comb is not staggered, is realized if k'=0 for all symbols, independently of the SRS length, comb size, and symbol number.

TABLE 1

RE offset k' for the SRS comb values $K_{TC} = $ 2, 4, 8 and number of SRS symbols $N_{symb}^{SRS}$

| Comb size $K_{TC}$ | SRS length $N_{symb}^{SRS}$ | \multicolumn{11}{c}{Symbol number l'} |
|---|---|---|---|---|---|---|---|---|---|---|---|---|
| | | 0 | 1 | 2 | 3 | 4 | 5 | 6 | 7 | 8 | 9 | 1 | 1 |
| 2 | 1 | 0 | | | | | | | | | | | |
| | 2 | 0 | 1 | | | | | | | | | | |
| | 4 | 0 | 1 | 0 | 1 | | | | | | | | |
| | 8 | 0 | 1 | 0 | 1 | 0 | 1 | 0 | 1 | | | | |
| | 12 | 0 | 1 | 0 | 1 | 0 | 1 | 0 | 1 | 0 | 1 | 0 | 1 |
| 4 | 1 | 0 | | | | | | | | | | | |
| | 2 | 0 | 2 | | | | | | | | | | |
| | 4 | 0 | 2 | 1 | 3 | | | | | | | | |
| | 8 | 0 | 2 | 1 | 3 | 0 | 2 | 1 | 3 | | | | |
| | 12 | 0 | 2 | 1 | 3 | 0 | 2 | 1 | 3 | 0 | 2 | 1 | 3 |
| 8 | 1 | 0 | | | | | | | | | | | |
| | 2 | 0 | 4 | | | | | | | | | | |
| | 4 | 0 | 4 | 6 | 2 | | | | | | | | |
| | 8 | 0 | 4 | 6 | 2 | 5 | 7 | 3 | 1 | | | | |
| | 12 | 0 | 4 | 6 | 2 | 5 | 7 | 3 | 1 | 0 | 4 | 6 | 2 |

In some embodiments, to e.g., realize the Release 15 behavior (non-staggered comb), a configuration setting k' to 0 is allowed, and switching between the non-staggered comb (k'=0) and the staggered comb (k' follows the Table 1) is controlled by a radio resource control (RRC) parameter (e.g., which may be transmitted/signaled by the network node 16 via RRC signaling and received by the WD 22). The WD 22 may then transmit SRS according to the RRC parameter, e.g., according to a staggered comb or non-staggered comb based on the RRC parameter.

In some embodiments, the RRC parameter is a Boolean configuration parameter set to true when staggered comb is used, and false when non-staggered comb is use. In other embodiments, the RRC parameter may be set to false for staggered comb and true for non-staggered comb. In other embodiments, the RRC parameter may be arranged in other ways. In some embodiments, the RRC parameter may be a bit, bit pattern, field, index, table, etc.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

APPENDIX

Standardizing the Proposed Solutions

The attached Appendix provides non-limiting examples of how certain aspects of the proposed solutions could be implemented within the framework of a specific communication standard. In particular, the attached Appendix provides non-limiting examples of how the proposed solutions could be implemented within the framework of a 3GPP TSG RAN standard. The changes described by the Appendix are merely intended to illustrate how certain aspects of the proposed solutions could be implemented in a particular standard. However, the proposed solutions could also be implemented in other suitable manners, both in the 3GPP Specification and in other specifications or standards.
3GPP TSG-RAN WG1 Meeting #98bis R1-19NNNNN
Chongqing, P.R China, Oct. 14th-20th 2019
Source: Ericsson
Title: UL Reference Signals for NR Positioning
Agenda item: 7.2.10.2
Document for: Discussion and Decision
INTRODUCTION During RAN1 #98, the discussion on enhancements to the SRS for positioning resulted in further agreements regarding the number of configurable symbols, comb size and staggered pattern. Each of these agreement carried further possible enhancements that are discussed in this paper.

Address power control and path loss in the procedure contribution.
UL SRS Design for Positioning
SRS Configuration
Support for RRC SRS The SRS configuration for UL positioning should follow previous LTE implementation. Similarly to the DL PRS, the SRS configuration supported by a cell is reported via NRPPa to the location server. If a UE is requested to perform e.g. UTDOA or RTT with SRS transmissions, the location server then informs the neighbor cells of the SRS configuration.

For Periodic positioning, the configuration is straightforward. The serving cell signals to the location server the configuration(s) it may use for SRS for positioning. Then, when the location server signals to the cell that a UE in this cell (hence, a serving cell) should use SRS, the serving cell configures the UE with SRS resources for positioning via RRC. During the same procedure, the location server should inform non-serving neighbor cells of the SRS configuration. Then the location server requests measurements and obtain reports from the UE via LPP.

Support for SRS aperiodic/SPS (include details of rrc config):

Aperiodic and semi-persistent SRS is also agreed to be supported [REF RAN1 #96b]. The extent of the support have been discussed in some contributions [REF], but have not yet resulted in agreements. Aperiodic and SPS SRS require a large overhead of signaling to operate in a multicell scenario. Essentially, The SRS RRC configuration that is triggered/activated in the serving cell must be forwarded to the neighbor cells via the location server. The neighbor cell must also be notified in advance of an upcoming SRS trigger.

The SRS for Positioning is Configured by the UE Serving Cell Via RRC

Aperiodic and Semi-Persistent SRS are Only Supported for the Serving Cell

The (Aperiodic) SRS for Positioning UE Configuration is Communicated to the UE Neighbor (Non-Serving) Cell Via NRPPa from the Location Server SRS Usage During the RAN1 97 meeting, an proposal was reached to have a new usage for positioning in SRS. The pre-existing (rel-15) usages for SRS are as follow:

nonCodebook is aimed, as the name suggests, at enabling non-codebook based PUSCH transmission. This SRS usages is restricted to a single SRS resource set made of up to 4 1-port SRS resources. This SRS configuration is aiming at giving the possibility for the network to confirm or revise the choice of PUSCH precoding by the UE, so that the network can respond by downselecting some of the layers (precoders) selected by the UE via the SRI field in DCI.

Codebook: is aimed at enabling codebook-based transmission of PUSCH. In this usage the SRS is transmitted for reciprocity-based channel sounding, and the network responds to the SRS transmission by sending the suitable precoding matrix to the UE. Only a single resource set may be configured with up to two SRS resources.

beamManagement: is aimed at identifying suitable beam candidates. In this usage, only one resource per resource set may be transmitted at a given time instant.

Antenna switching: is aimed at reciprocity-based DL CSI acquisition via SRS carrier switching.

As can be seen, all usages are clearly mapped to different application of the SRS. Similarly, a new usage for positioning should be added. Among the differences in SRS for positioning, the use of periodic SRS for positioning purpose will require multiple sets to handle different path loss settings for the serving and neighbouring cells, so that the antenna switching, noncodebook and codebook usages are not possible to reuse when the serving cell path loss as well as a neighbour cell path loss should be handled.

Define a SRS Usage for Positioning
SRS Pattern for Positioning and Resource Allocation During RAN1 #96b, RAN1 #97 and RAN1 98, the following agreement was reached:

Agreement:
Comb-N resource element pattern per DL PRS Resource is supported to map DL PRS sequence to resource elements in frequency domain
Comb-N pattern can shift in frequency domain across symbols within DL PRS Resource
FFS values for N. The potential values for down-selection are provided in the set {1,2,3,4,6,8,12}
FFS relationship between N and number of symbols per DL PRS Resource
FFS support of staggered and non-staggered patterns and exact definition of staggered pattern Agreement:
SRS transmissions for positioning are realized with staggered patterns (a collection of SRS symbols from the same antenna port with different offsets for at least some symbols) in a single SRS resource
FFS: construction of the pattern inside the SRS resource structure Agreement:
The RE pattern of an SRS resource for positioning is configured with a comb offset for the first symbol in an SRS resource.
The relative RE offsets of following symbols are defined relative to the comb offset of the first symbol in the SRS resource.
A relative RE offset of each of the following symbols is derived from the configured number of symbols for an SRS resource, the comb size for the SRS resource and the SRS symbol index within the SRS resource.
FFS: The use of the following for deriving the relative offset in addition to the above
A configurable number of consecutive symbols with the same offset
Repetition factor
No additional parameters will be considered Conclusion:
No additional comb sizes for SRS for positioning purposes will be introduced in Rel-16 beyond those already agreed.

Conclusion:
No additional number of symbols per SRS resource other than the values already agreed is supported Discussion on the Relative RE Offset Per Symbol. Optimized for the Patterns we Propose
Discuss the Number of Symbols Vs Comb Size
Staggered Comb Pattern Per previous agreement the SRS for positioning is using a fixed pattern which uses relative RE positions for each SRS symbol based on the RE position of the first symbol in the resource. Based on the agreements, there are possible configuration where the number of configured SRS symbols exceed the comb size. In that case, it is proposed to continue the comb staggered pattern cyclically over the number of symbols.

The SRS pattern over a number of symbols larger than the comb size follows the comb staggered pattern cyclically i.e. the symbol number I RE offsets are the same as symbol I mod $K_{TC}$ A relative RE offset pattern for SRS may be realized by configuring each SRS OFDM symbol position (with a frequency-domain starting position $k_0^{(pi)}$ defined by $$k_0^{(p_i)} = \bar{k}_0^{(p_i)} + \sum_{b=0}^{B_{SRS}} K_{TC} M_{sc,b}^{SRS} n_b + k'$$

Where the RE offset k' is dependent of the comb size and the number of symbols. the RE offset k' values are described for the different comb values and SRS length in table 1.

TABLE 2

RE offset k' for the SRS comb values $K_{TC} = 2, 4, 8$ and number of SRS symbols $N_{symb}^{SRS}$

| Comb size $K_{TC}$ | SRS length $N_{symb}^{SRS}$ | \multicolumn{12}{c}{Symbol number I'} | | | | | | | | | | | |
|---|---|---|---|---|---|---|---|---|---|---|---|---|---|
| | | 0 | 1 | 2 | 3 | 4 | 5 | 6 | 7 | 8 | 9 | 1 | 11 |
| 2 | 1 | 0 | | | | | | | | | | | |
| | 2 | 0 | 1 | | | | | | | | | | |
| | 4 | 0 | 1 | 0 | 1 | | | | | | | | |
| | 8 | 0 | 1 | 0 | 1 | 0 | 1 | 0 | 1 | | | | |
| | 12 | 0 | 1 | 0 | 1 | 0 | 1 | 0 | 1 | 0 | 1 | 0 | 1 |
| 4 | 1 | 0 | | | | | | | | | | | |
| | 2 | 0 | 2 | | | | | | | | | | |
| | 4 | 0 | 2 | 1 | 3 | | | | | | | | |
| | 8 | 0 | 2 | 1 | 3 | 0 | 2 | 1 | 3 | | | | |
| | 12 | 0 | 2 | 1 | 3 | 0 | 2 | 1 | 3 | 0 | 2 | 1 | 3 |
| 8 | 1 | 0 | | | | | | | | | | | |
| | 2 | 0 | 4 | | | | | | | | | | |
| | 4 | 0 | 4 | 6 | 2 | | | | | | | | |
| | 8 | 0 | 4 | 6 | 2 | 5 | 7 | 3 | 1 | | | | |
| | 12 | 0 | 4 | 6 | 2 | 5 | 7 | 3 | 1 | 0 | 4 | 6 | 2 |

- the RE starting position equation in 38.211 is changed to equation 1 with the additional RE offset k' described in table 1
- the RE offset k' that controls the staggering of the RE allocation may be disabled by RRC configuration to allow rel-15 behaviour Support of Frequency Hopping and Repetitions Discuss the use of repetition in general. We should not need anything special within a pattern (address support of staggered or non staggered).

Figure 12:
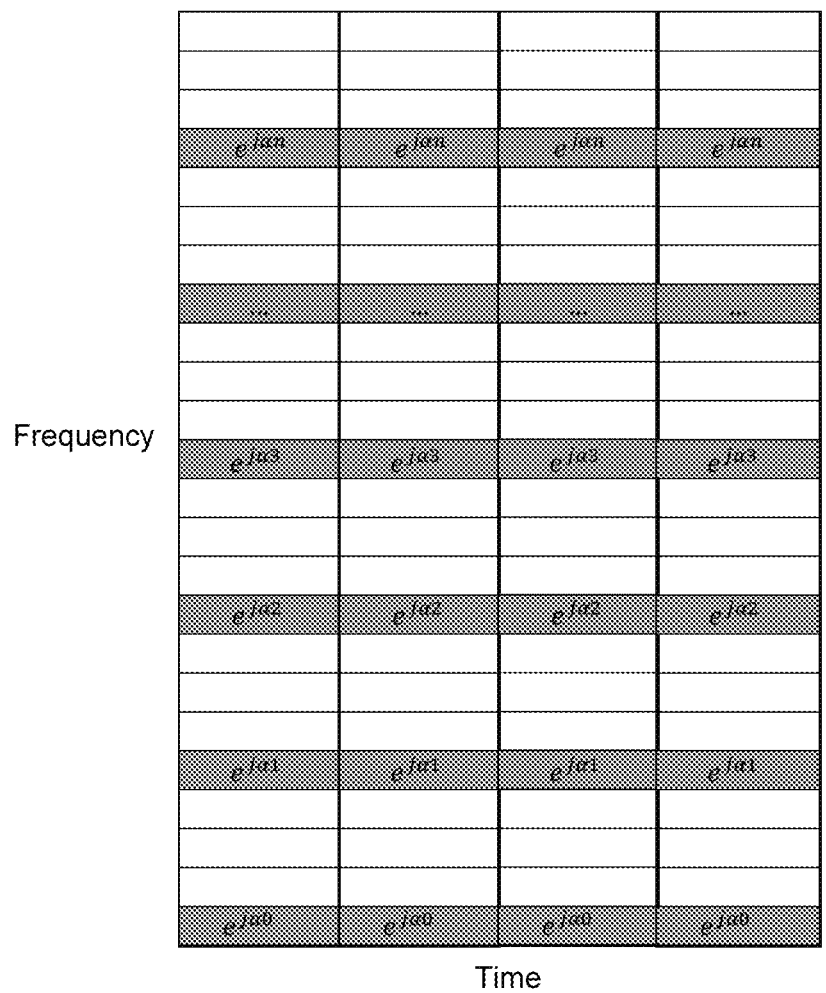
FIG. 12 Cyclic shift allocation for SRS, where the resource spans 4 symbols.

Frequency hopping allows a UE that is power limited to transmit portions of the SRS bandwidth in each symbol of the resource, and use frequency hopping to span the intended bandwidth. The frequency hopping principle is illustrated in FIG. 12.

One could argue that the staggered comb used for positioning serves a similar role. Each symbol in the comb uses a fraction of the total number of REs in the symbol. These REs can be boosted by borrowing the unallocated REs power. If the full transmission pattern is used, the full bandwidth is covered. Thus, the use of frequency hopping on a staggered comb SRS transmission seems redundant.

Do not support frequency hopping for SRS transmission with a staggered comb.

Repetitions can be used to increase coverage of the SRS. In legacy SRS, repetition is only relevant to transmission with frequency hopping, since the comb-based transmission is not staggered in legacy SRS, a transmission without frequency hopping is always using repetition.

A staggered pattern could be repeated to ensure coverage is at a desired level. For repetition of the pattern over multiple symbols, In a measurement multiple resources or instances of the periodic SRS can be used and accumulated in a measurement to achieve the gains of repetition.

Repetition of the whole pattern over multiple slots can be achieved without change in the SRS framework, but either additional resource allocation or using several instances of the periodic transmission For repetitions within a slot, it is possible to fall back to legacy SRS patterns (non-staggered) to have the same comb repeated over the resource, or to cyclically repeat the staggered pattern by configuring more symbols in the resource than the comb size.

- the staggered pattern can be disabled to follow rel-15 resource mapping, and offer repetition gain over one comb
- the staggered pattern can be repeated by configuring a resource with more symbol than the comb size.

Do not support additional features to enable repetitions

Use of PTRS Configuration Field

In the SRS resource configuration, The PTRS port index field is only relevant when a phase tracking reference signal is configured. The reason for this field is that, in non-codebook based UL MIMO, each PUSCH layer transmission is connected to an SRS resource. The SRS is configured with the PTRS port index to identify the PTRS to use during PUSCH demodulation. Therefore the field should not be used when SRS is transmitted in other usage than "non-codebook"

The Ptrs-PortIndex Field is not Configured in SRS for Positioning

Cyclic Shifts Configuration for SRS use of full range for cyclic shift with staggered comb address that CS should be configured based on the comb-1 muxing to avoid losing range.

The allocation of the cyclic shift over a comb folds the cyclic shift range within the comb duration, so that the time-domain representation of the cyclic shift is periodic with period $T/K_{TC}$. While this is the correct behavior for the non-staggered SRS comb, it should be modified when a fully or partially staggered pattern is used, to utilize the full range of the comb-1 equivalent full stagger. One way to resolve this is to have the sequence distributed over the full comb so that each symbol in the pattern features a part of the cyclic shift sequence. The current implementation of cyclic shift for SRS is as follow [38.211]:

$$r_{u,v}^{(\alpha,\delta)}(n) = e^{j\alpha n} \bar{r}_{u,v}(n), \; 0 \le n < M_{ZC}, \text{ with } M_{ZC} = mN_{sc}^{RB}/K_{TC}$$

For SRS bandwidth covering more than 36 active sub-carriers (based on the size of the comb, the corresponding bandwidth is (6PRBs for comb 2,12 PRB for comb 4, 24PRBs for comb 8), the SRS is using a Zadoff Chu (ZC) base sequence. Shorter base sequences use computer generated sequences (CGS). The sequence is then mapped onto to the time-frequency grid, accounting for the comb size with $$r^{(p_i)}(n, l') = r_{u,v}^{(\alpha_i,\delta)}(n)$$

$$0 \le n \le M_{sc,b}^{RS} - 1$$

$$l' \in \{0, 1, \ldots, N_{symb}^{SRS} - 1\}$$

where $\delta = \log_2 K_{TC}$ and $K_{TC}$ is the comb factor. So that the SRS is mapped on the time frequency grid as:

$$a^{(p_i)}_{K_{TC}k'+k_0^{(p_i)},l'+l_0} =$$

$$\begin{cases} \frac{1}{\sqrt{N_{ap}}} \beta_{SRS} r^{(p_i)}_{\square}(k', l') & k' = 0, 1, \ldots, M^{RS}_{sc,b} - 1 \; l' = 0, 1, \ldots, N^{SRS}_{symb} - 1 \\ 0 & \text{otherwise} \end{cases}$$

where length of the sounding reference signal sequence $M_{sc,b}^{RS}$ is given by $$M_{sc,b} = M_{SRS,b} N_{sc}^{RB}/K_{TC}$$

where $m_{SRS,b}$ is the bandwidth allocation in number of PRBs, $N_{sc}^{RB}$ is the PRB size.

Figure 13:
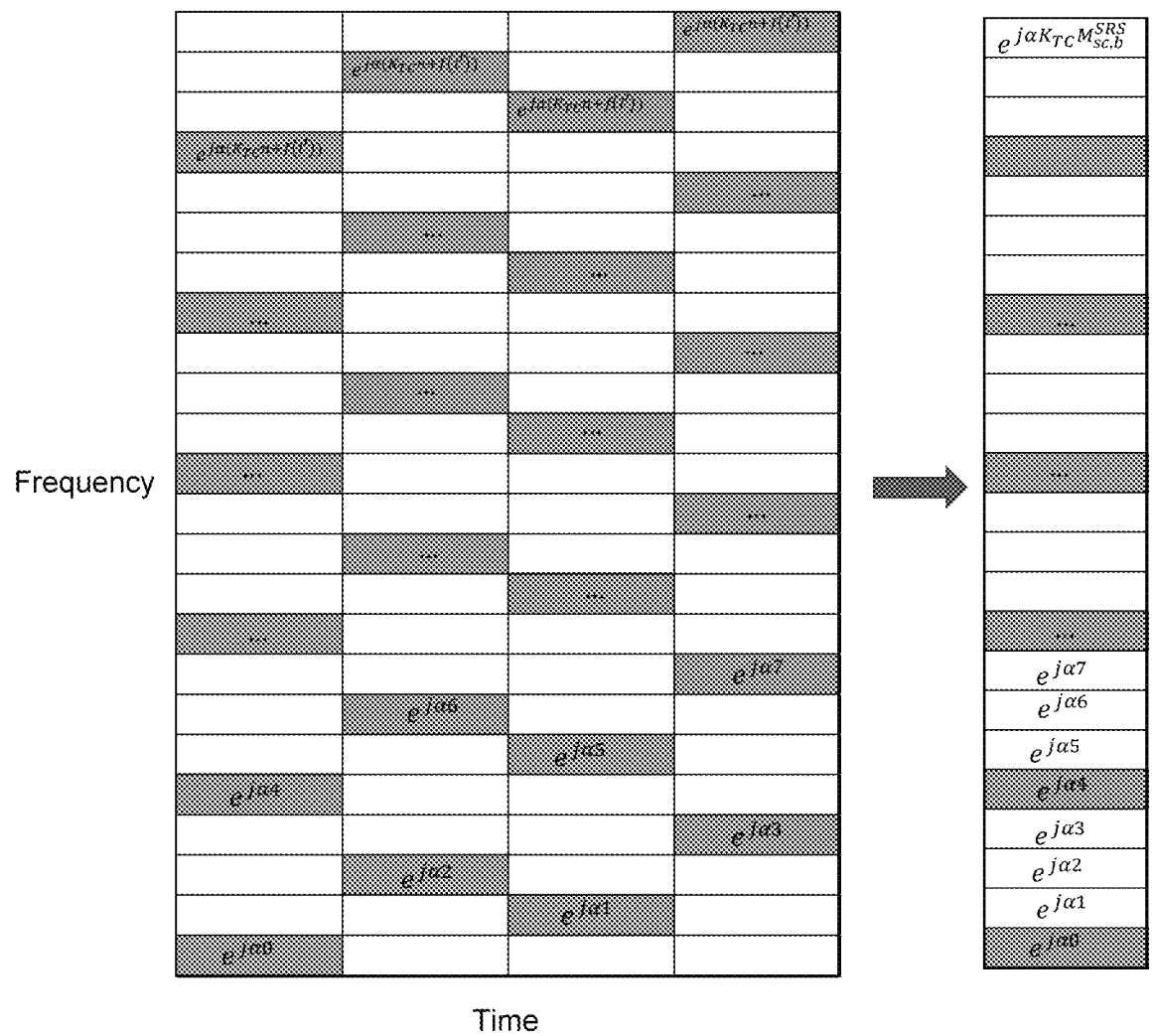
FIG. 13 illustrates how the cylic shift is applied on the frequency grid.

FIG. 13 shows the way cyclic shifts are applied on a staggered comb with the current agreements in place, and how they should be applied to allow a full range use. Once the staggered comb is collapsed into a comb-1 symbol, the cyclic shift sequence spans the whole symbol and is thus full range.

The modified CS needs to account for the staggered comb sequence is then:

$$r^{(p_i)}(n, l') = r^{(\alpha_i, K_{TC}, l')}_{u,v}(n)$$

Where $$r^{(\alpha_i, K_{TC}, l')}_{u,v}(n) = e^{j\alpha(K_{TC} * n + f(l'))} \bar{r}_{u,v}(n) \quad (1)$$

The cyclic shift of the UL SRS may be either applied according to REL-15 behaviour, or follow a symbol-based behavior as shown in equation 1
Increased Number of Cyclic Shifts
address why more cyclic shift is a good thing In the uplink, each UEs is assigned a specific SRS resource for transmission. In order to accommodate as many UEs as possible in the shortest possible time, it is thus of interest to increase the multiplexing of UEs over a single symbol. This can be of interest especially in industrial indoor scenarios where the deployment is favorable to using relatively high combs and number of cyclic shifts and many UEs will share the resources. In a typical 300sqm hall, it is not unreasonable to expect hundred to thousands of UEs managed. In order to allow an efficient use of the time frequency resource, the positioning reference signals cannot take too much of the resource allocation, and therefore multiplexing should be considered when possible.

For indoor industrial scenarios at least, a short channel spread is expected so that a large amount of cyclic shift/combs could be used without interfering signals between UEs. In our downlink contribution [2], we discuss the issue of cyclic shifts and combs for DL PRS. The same discussion could be done for UL SRS. The number of UL SRS cyclic shift is specified to be up to 8 for comb-2 and 12 for comb 4, respectively, based on a certain delay spread assumption and cell size as well as the combed symbol unaliased range. Based on the previous discussion, most use cases of interest to SRS-based positioning are indoor, that is to say with a small cell size and delay spread. In this case a tighter spacing of cyclic shifts could be realized, with the largest amount of available cyclic shift being when a full range symbol (i.e. comb-1 or full staggered comb pattern) is available, in which case the cyclic shifts could be distributed over the full symbol range.

Table 1 from [2] is reproduced below for convenience and shows the number of orthogonal cyclic shift signals tolerating a certain delay for different numerologies, based on a full-range symbol availability. Patterns with M<N symbols for a comb-N SRS resource will have a subset of these cyclic shifts available, due to the reduced unaliased symbol duration.

As seen in table 3, the available number of cyclic shifts, at least for FR1, is much larger than the currently configurable values for SRS. Note that the table consider a comb-1 signal where the whole signal duration can be exploited. Currently, specifications limit the number of cyclic shifts to 8 in comb 2 (i.e. up to 16 UE can be potentially multiplexed within the SRS symbol duration) and 12 for comb 4 (48 UEs multiplexed in the SRS). In our calculation, considering the delays occurring in an indoor scenario, up to about 130 UEs could be multiplexed in a single symbol (at SCS 15 kHz). This could be achieved with e.g comb 8 and 24 cyclic shifts (where only a subsets of shifts could be used, up to 133 out of 192), comb 4 and 48 shifts, comb 2 and 96 shifts, etc. Hence depending on comb value, the Maximum number of cyclic shifts $n_{SRS}^{cs,max}$ should be increased accordingly to reach the maximum available number of CS for the delay incurred by the scenario. Moreover, in order to avoid issues with legacy, the new maximum number of cyclic shifts should be a multiple of the legacy. Thus it is proposed to increase $n_{SRS}^{cs,max}$ possible values to also include 24 and 48.

The possible values for the maximum number of cyclic shifts for SRS is increased to [8,12,24,48]

In the current specification, $n_{SRS}^{cs,max}$ is hardcoded to the value of the comb size. While that may be valid for other use, for the purpose of positioning, the connection between the comb size and the maximum number cs,max of cylic shift could be removed and instead $n_{SRS}^{cs,max}$ should be configured as part of the resource configuration.

Maximum number of cyclic shifts $n_{SRS}^{cs,max}$ and comb size should be independently configured at the resource set level.

The actual cyclic shift of a SRS resource should be configured by the parameter $n_{SRS}^{cs} \in \{0,1,2, \ldots, n_{SRS}^{cs,max}-1\}$.

TABLE 3

Number of orthogonal cyclic shift signals tolerating a certain delay for different numerologies.

| | | Number of orthogonal cyclic shift signals tolerating a given delay (assuming comb-1, full bandwidth SRS) | | |
|---|---|---|---|---|
| Subcarrier spacing | OFDM symbol length without CP | Max 0.5 µs delay (150 m) | Max 1 µs delay (300 m) | Max 1.5 µs delay (450 m) |
| 15 KHz | 66.7 µs | 133 | 67 | 44 |
| 30 KHz | 33.3 µs | 67 | 33 | 22 |
| 60 KHz | 16.7 µs | 33 | 17 | 11 |
| 120 KHz | 8.3 µs | 17 | 8 | 6 |

CONCLUSIONS

In the previous sections we made the following observations:

Observation 1 Repetition of the whole pattern over multiple slots can be achieved without change in the SRS framework, but either additional resource allocation or using several instances of the periodic transmission Observation 2 the staggered pattern can be disabled to follow rel-15 resource mapping, and offer repetition gain over one comb Observation 3 the staggered pattern can be repeated by configuring a resource with more symbol than the comb size.

And the following proposals:

Proposal 1 The SRS for positioning is configured by the UE serving cell via RRC

Proposal 2 Aperiodic and semi-persistent SRS are only supported for the serving cell Proposal 3 The (aperiodic) SRS for positioning UE configuration is communicated to the UE neighbor (non-serving) cell via NRPPa from the location server Proposal 4 Define a SRS usage for positioning Proposal 5 The SRS pattern over a number of symbols larger than the comb size follows the comb staggered pattern cyclically i.e. the symbol number I RE offsets are the same as symbol i mod $K_{TC}$ Proposal 6 the RE starting position equation in 38.211 is changed to equation 1 with the RE offset function $f(l')$ described in table 1

Proposal 7 the function $f$ $(l')$ that controls the staggering of the RE allocation may be disabled by RRC configuration to allow rel-15 behaviour Proposal 8 Do not support frequency hopping for SRS transmission with a staggered comb.

Proposal 9 Do not support additional features to enable repetitions

Proposal 10 The ptrs-Port index field is not configured in SRS for positioning

Proposal 11 The cyclic shift of the UL SRS may be either applied according to REL-15 behaviour, or follow a symbol-based behavior as shown in equation 1

Proposal 12 The possible values for the maximum number of cyclic shifts for SRS is increased to [8,12,24,48]

Proposal 13 Maximum number of cyclic shifts nSRScs, max and comb size should be independently configured at the resource set level.

Proposal 14 The actual cyclic shift of a SRS resource should be configured by the parameter nSRScs $\in 0,1,2,\ldots$, nSRScs, max−1.

Embodiments

Embodiment A1. A network node configured to communicate with a wireless device (WD), the network node configured to, and/or comprising a radio interface and/or comprising processing circuitry configured to:

signal a sounding reference signal (SRS) configuration, the SRS configuration including an SRS configuration parameter that indicates whether to use one of a staggered comb and a non-staggered comb for an SRS transmission; and receive the SRS transmission according to the one of the staggered comb and the non-staggered comb indicated by the SRS configuration parameter.

Embodiment A2. The network node of Embodiment A1, wherein the SRS configuration parameter is signaled via radio resource control (RRC) signaling.

Embodiment A3. The network node of Embodiment A1, wherein the SRS configuration further includes a usage parameter and the SRS configuration parameter that indicates whether to use one of the staggered comb and the non-staggered comb for the SRS transmission is different from and/or independent of the usage parameter.

Embodiment B1. A method implemented in a network node, the method comprising:

signaling a sounding reference signal (SRS) configuration, the SRS configuration including an SRS configuration parameter that indicates whether to use one of a staggered comb and a non-staggered comb for an SRS transmission; and receiving the SRS transmission according to the one of the staggered comb and the non-staggered comb indicated by the SRS configuration parameter.

Embodiment B2. The method of Embodiment B1, wherein the SRS configuration parameter is signaled via radio resource control (RRC) signaling.

Embodiment B3. The method of Embodiment B1, wherein the SRS configuration further includes a usage parameter and the SRS configuration parameter that indicates whether to use one of the staggered comb and the non-staggered comb for the SRS transmission is different from and/or independent of the usage parameter.

Embodiment C1. A wireless device (WD) configured to communicate with a network node, the WD configured to, and/or comprising a radio interface and/or processing circuitry configured to:

receive a sounding reference signal (SRS) configuration, the SRS configuration including an SRS configuration parameter that indicates whether to use one of a staggered comb and a non-staggered comb for an SRS transmission; and transmit the SRS transmission according to the one of the staggered comb and the non-staggered comb indicated by the SRS configuration parameter.

Embodiment C2 . . . . The WD of Embodiment C1, wherein the SRS configuration parameter is received via radio resource control (RRC) signaling.

Embodiment C3. The WD of Embodiment C1, wherein the SRS configuration further includes a usage parameter and the SRS configuration parameter that indicates whether to use one of the staggered comb and the non-staggered comb for the SRS transmission is different from and/or independent of the usage parameter.

Embodiment D1. A method implemented in a wireless device (WD), the method comprising:

receiving a sounding reference signal (SRS) configuration, the SRS configuration including an SRS configuration parameter that indicates whether to use one of a staggered comb and a non-staggered comb for an SRS transmission; and transmitting the SRS transmission according to the one of the staggered comb and the non-staggered comb indicated by the SRS configuration parameter.

Embodiment D2. The method of Embodiment D1, wherein the SRS configuration parameter is received via radio resource control (RRC) signaling.

Embodiment D3. The method of Embodiment D1, wherein the SRS configuration further includes a usage parameter and the SRS configuration parameter that indicates whether to use one of the staggered comb and the non-staggered comb for the SRS transmission is different from and/or independent of the usage parameter.

The invention claimed is:

1. A network node configured to communicate with a wireless device, the network node configured comprising a radio interface and processing circuitry configured to:
signal a sounding reference signal, SRS, configuration, the SRS configuration including an SRS configuration parameter that indicates whether to use one of a staggered comb and a non-staggered comb for an SRS transmission, the SRS configuration parameter indicating a resource element position offset and the resource element position offset being dependent on at least one of a size of the comb and a number of SRS symbols; and
receive the SRS transmission according to the one of the staggered comb and the non-staggered comb indicated by the SRS configuration parameter.

2. The network node of claim 1, wherein the SRS configuration parameter is signaled via radio resource control, RRC, signaling.

3. The network node of claim 1, wherein the SRS configuration further includes a usage parameter and the SRS configuration parameter that indicates whether to use one of the staggered comb and the non-staggered comb for the SRS transmission is at least one of different from and independent of the usage parameter.

4. The network node of claim 3, wherein the usage parameter is positioning.

5. A method implemented in a network node, the method comprising:
signaling a sounding reference signal, SRS, configuration, the SRS configuration including an SRS configuration parameter that indicates whether to use one of a staggered comb and a non-staggered comb for an SRS transmission, the SRS configuration parameter indicating a resource element position offset and the resource element position offset being dependent on at least one of a size of the comb and a number of SRS symbols; and
receiving the SRS transmission according to the one of the staggered comb and the non-staggered comb indicated by the SRS configuration parameter.

6. The method of claim 5, wherein the SRS configuration parameter is signaled via radio resource control, RRC, signaling.

7. The method of claim 5, wherein the SRS configuration further includes a usage parameter and the SRS configuration parameter that indicates whether to use one of the staggered comb and the non-staggered comb for the SRS transmission is at least one of different from and independent of the usage parameter.

8. The method of claim 7, wherein the usage parameter is positioning.

9. A wireless device (22), WD, configured to communicate with a network node, the WD comprising a radio interface and a processing circuitry configured to:
receive a sounding reference signal, SRS, configuration, the SRS configuration including an SRS configuration parameter that indicates whether to use one of a staggered comb and a non-staggered comb for an SRS transmission, the SRS configuration parameter indicating a resource element position offset and the resource element position offset being dependent on at least one of a size of the comb and a number of SRS symbols; and
transmit the SRS transmission according to the one of the staggered comb and the non-staggered comb indicated by the SRS configuration parameter.

10. The WD of claim 9, wherein the SRS configuration parameter is received via radio resource control, RRC, signaling.

11. The WD of claim 9, wherein the SRS configuration further includes a usage parameter and the SRS configuration parameter that indicates whether to use one of the staggered comb and the non-staggered comb for the SRS transmission is at least one of different from and independent of the usage parameter.

12. The WD of claim 11, wherein the usage parameter is positioning.

13. A method implemented in a wireless device (WD), the method comprising:
receiving a sounding reference signal (SRS) configuration, the SRS configuration including an SRS configuration parameter that indicates whether to use one of a staggered comb and a non-staggered comb for an SRS transmission, the SRS configuration parameter indicating a resource element position offset and the resource element position offset being dependent on at least one of a size of the comb and a number of SRS symbols; and
transmitting the SRS transmission according to the one of the staggered comb and the non-staggered comb indicated by the SRS configuration parameter.

14. The method of claim 13, wherein the SRS configuration parameter is received via radio resource control, RRC, signaling.

15. The method of claim 13, wherein the SRS configuration further includes a usage parameter and the SRS configuration parameter that indicates whether to use one of the staggered comb and the non-staggered comb for the SRS transmission is at least one of different from and independent of the usage parameter.

16. The method of claim 15, wherein the usage parameter is positioning.

\* \* \* \* \*